Patented Apr. 30, 1929.

1,710,914

UNITED STATES PATENT OFFICE.

CHANNING C. BEETH, OF DULUTH, MINNESOTA.

PROCESS OF TREATING HEMP WASTE.

No Drawing.   Application filed January 23, 1928.   Serial No. 248,983.

In the manufacture of binder twine, rope and similar products, the raw material generally used is fibre from Manila and African hemp, or Mexican and Yucatan sisal.

The long fibre is stripped from the plants in the country in which it is grown and is generally shipped in bales of several hundred pounds each to the factories where it is to be used.

At the factory, a short while before a bale is opened for use, there is poured over it several gallons of a mixture of light mineral oil called "cordage oil," and one or two cheap animal fat oils, by-products of tannery or packing plants. After the bale is opened and as the fibre is started running through the breaker or the first of the twine or rope forming machines, it is passed through a second bath of usually the same oil mixture. It is usually estimated that for every hundred pounds of fibre, 15 to 18 pounds of oil is used. The oil soaks into the fibre, softens it and adds to its weight. This latter is not objectionable as the finished product is generally sold by weight.

For every 100 pounds of oil soaked fibre going through the breaker or first machine in the twine or rope making process, 8 to 10 pounds is lost in the shape of lint during the progress through the several machines used. This lint is swept up from around these various machines and is known as twine dirt or hemp waste. Being such a fine lint-like stuff, it naturally absorbs more oil in proportion than the long hard fibres that go into twine or rope. By experiment, I have found that from 25 to 30% of its weight is oil. Ordinarily the oil-soaked waste is used for fuel. It is swept up from around the machines and its fuel value is about off-set by the cost of handling. This waste is a big item of loss in any twine or rope factory, especially in view of the fact that it soaks up great quantities of the cordage oil used in the factory and which oils are of necessity burned along with the waste.

The object of my invention is to free the waste product from the oil carried thereby; to save the oil for future use, and to utilize the waste thus freed from the oil for the production of composition or fibre board material.

In carrying out my invention, the waste to be converted is placed in a vat and thoroughly soaked for a period of approximately twelve hours in a solution of sodium hydroxide (caustic soda) or common lye in water. The strength of the solution is preferably sufficient only to make a bit of the saturated waste feel soapy and smooth between the fingers. After the soaking period, the mass is cooked by running live steam through it for about thirty minutes after it has all reached the boiling point. Proper cooking gives the whole a mush-like appearance and a sticky slick feel, and after a few minutes setting, an oily scum appears on the surface. This steam cooking is preferably done under pressure, as thereby the fibre is more completely broken up and better results are obtained. Pressure cooking, however, is not essential.

After being thoroughly cooked, as much as possible of the liquid is drained off and caught in suitable containers. The mush mass remaining is preferably put through a series of rollers, squeezing out as much more of the liquid as possible, and the mass is then ready for pressing into sheets. In passing the material through the press, it is preferably subjected to a pressure of from 20 to 25 tons, and the press at this period should be in a heated condition. Passing this material through the press produces boards of considerable width and thickness and the boards dry out to a great extent while under pressure in the pressing. Surfaces, colors, thicknesses, etc., can be obtained as desired, as the material is capable of being processed and colored.

The liquid drained off and pressed out is saved and allowed to stand in containers for a preferred length of time, usually six to eight hours. A white sort of paste usually forms on the surface of the liquid. This paste is drawn or skimmed off and thoroughly cooked and yields a considerably quantity of oil. The cooking should be continued until the oil content is readily separable and can be drained, squeezed or filtered off.

The brown liquid remaining after the oil bearing paste has been taken off, as above set forth, is the original caustic solution only slightly weakened by using. It can be used again and again by adding a little fresh material to it each time to keep up its strength.

The waste thus treated and freed from the oil content, is found to be almost pure cellulose. It may be used for the manufacture of composition fibre board of any desired width and thickness. It may also be used in the manufacture of explosives, paper celluloid, artificial silk (rayon), and many other things equally valuable.

An ordinary twine plant will produce as high as from 4 to 6,000 pounds of waste per day. From this amount of waste 200 to 300 gallons of oil may be obtained by my process.

I have also found that by leaving in a very little of the oil content, and by pressing without heat, and letting dry slightly on steam pipes, a tough leather-like material can be made, much similar to belting. I may also produce alcohol from the purified waste and this can be done more efficiently than from wood fibre, as the purified waste is of a more nearly cellulose composition.

I claim as my invention:

1. The process of treating oil soaked hemp waste, which consists in soaking the waste in a solution of sodium hydroxide, running live steam through the mass thus produced, and thereby thoroughly cooking the same, removing the liquid, and pressing the resulting product into sheets.

2. The process of treating oil soaked waste, which consists in soaking the waste in a solution of sodium hydroxide, running live steam through the mass thus produced, and thereby thoroughly cooking the same, removing the liquid and recovering the oil therefrom, and pressing the resulting product into sheets.

3. The process of treating oil soaked waste produced in the production of twine or rope from hemp or sisal, which consists in soaking the waste in a solution of sodium hydroxide, running live steam through the mass thus produced, and thereby thoroughly cooking the same, removing the liquid and pressing the resulting product into a desired shape.

4. The process of producing composition fibre board, which consists in soaking oil soaked waste from twine or cordage machines, in a solution of sodium hydroxide, running live steam through the mass thus produced, thereby thoroughly cooking the same, removing the liquid and pressing the resulting product into sheets of desired width and thickness.

5. The process of treating hemp waste which consists in soaking the waste in a solution of caustic alkali, cooking the mass thus produced by the application of steam thereto, removing the liquid and compacting the resulting product into a desired shape.

In witness whereof, I have hereunto set my hand this 14th day of January, 1928.

CHANNING C. BEETH.